United States Patent
Sasakura

(10) Patent No.: US 7,430,010 B2
(45) Date of Patent: Sep. 30, 2008

(54) IMAGE SENSING APPARATUS WITH FOCUSING CCD MOVABLY INSERTED IN A LIGHT SPLITTING PATH OF A HALF-MIRROR

(75) Inventor: Minoru Sasakura, Akiruno (JP)

(73) Assignee: Casio Computer Co., Ltd., Tokyo (JP)

( * ) Notice: Subject to any disclaimer, the term of this patent is extended or adjusted under 35 U.S.C. 154(b) by 724 days.

(21) Appl. No.: 10/946,515

(22) Filed: Sep. 21, 2004

(65) Prior Publication Data

US 2005/0068453 A1 Mar. 31, 2005

(30) Foreign Application Priority Data

Sep. 29, 2003 (JP) ............................. 2003-337670

(51) Int. Cl.
H04N 5/232 (2006.01)
(52) U.S. Cl. ...................................... 348/345; 348/351
(58) Field of Classification Search ................. 348/345, 348/351
See application file for complete search history.

(56) References Cited

U.S. PATENT DOCUMENTS

| 4,739,411 A | 4/1988 | Bolton |
| 2001/0055488 A1 | 12/2001 | Shono |
| 2002/0140839 A1 | 10/2002 | Yahagi |
| 2003/0173494 A1 | 9/2003 | Nakamura |

FOREIGN PATENT DOCUMENTS

| EP | 1 347 639 A1 | 9/2003 |
| JP | 03-171878 A | 7/1991 |
| JP | 3-285467 A | 12/1991 |
| JP | 04-345279 A | 12/1992 |
| JP | 08-050227 A | 2/1996 |
| JP | 2004-109831 | 4/2004 |

OTHER PUBLICATIONS

Notification Concerning Transmittal of International Preliminary Report on Patentability, Chapter 1 of the Patent Cooperation Treaty and Written Opinion of the International Searching Authority for PCT/JP2004/013984, 9 sheets.
Japanese Office Action (and English translation thereof) dated Apr. 8, 2008, issued in a counterpart Japanese Application.

Primary Examiner—James M Hannett
(74) Attorney, Agent, or Firm—Frishauf, Holtz, Goodman & Chick, P.C.

(57) ABSTRACT

A half-mirror is interposed between a photographing lens and a photographing CCD, and a focusing CCD is movably inserted in the light splitting path of the half-mirror. In photographing, particularly in photographing of a motion image, the focusing CCD is moved to search for an in-focus position. A position to which the photographing lens is to be moved is decided from the positions of the focusing CCD and photographing lens after search. The photographing lens is directly moved to the decided position. The lens need not be moved for searching for an in-focus position during photographing, and in-focus image data can be recorded.

19 Claims, 10 Drawing Sheets

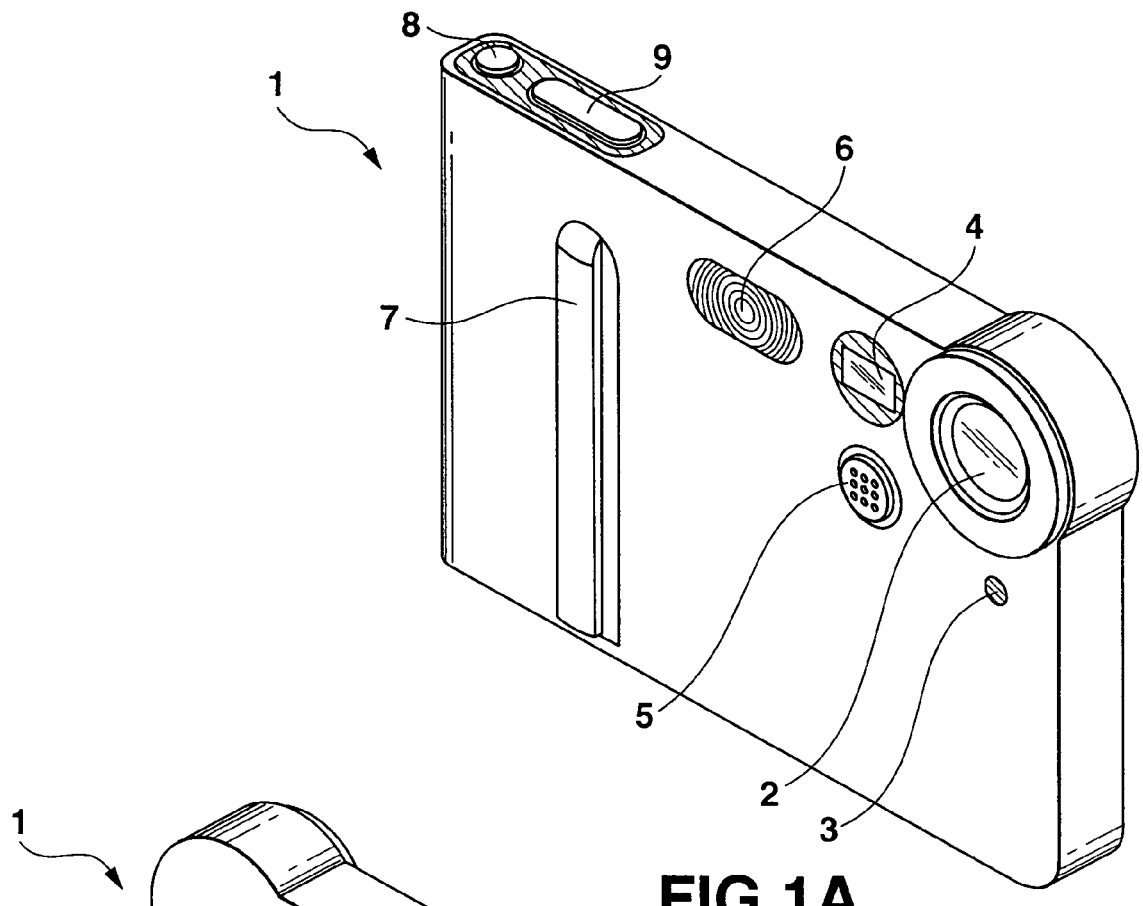
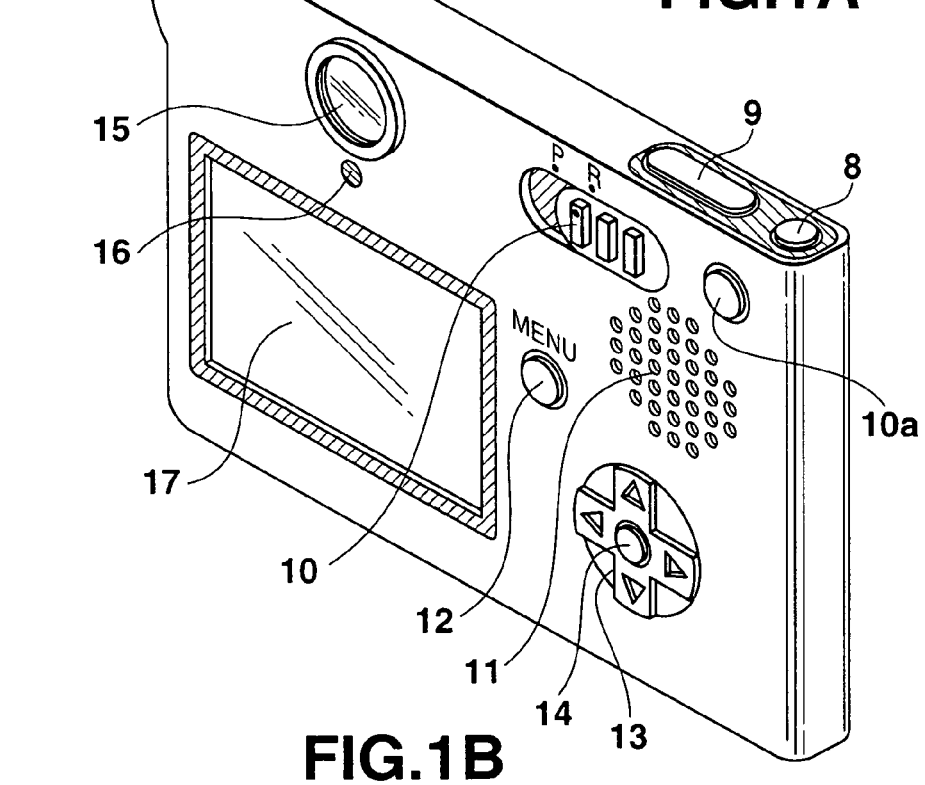

IMAGE SENSING APPARATUS WITH FOCUSING CCD MOVABLY INSERTED IN A LIGHT SPLITTING PATH OF A HALF-MIRROR

CROSS-REFERENCE TO RELATED APPLICATIONS

This application is based upon and claims the benefit of priority from prior Japanese Patent Application No. 2003-337670, filed Sep. 29, 2003, the entire contents of which are incorporated herein by reference.

BACKGROUND OF THE INVENTION

1. Field of the Invention

The present invention relates to an image sensing apparatus such as a digital camera or digital video camera and, more particularly, to an image sensing apparatus preferably used to take a motion image by using an autofocus function.

2. Description of the Related Art

Some image sensing apparatuses such as a digital camera and digital video camera comprise an automatic focusing function of automatically focusing the camera on an object. The automatic focusing function is called an "autofocus function" or "AF function". Digital cameras generally adopt a method of extracting the high-frequency component of a luminance signal obtained from a CCD (Charge Coupled Device) serving as an image sensing element, evaluating an in-focus position, and moving the photographing lens to a position at which the high-frequency component maximizes (see, e.g., Jpn. Pat. Appln. KOKAI Publication No. 3-285467).

With an image sensing apparatus having the above-mentioned automatic focusing function, the user can easily obtain an in-focus image in photographing without any consciousness. However, the conventional autofocus method searches for an in-focus position by moving the photographing lens forward and backward along the optical axis, as disclosed in Jpn. Pat. Appln. KOKAI Publication No. 3-285467. If a motion image is taken (recorded), an out-of-focus image is recorded during search for the in-focus position.

BRIEF SUMMARY OF THE INVENTION

According to an aspect of the present invention, an image sensing apparatus comprises a photographing lens, a first image sensing element configured to receive light having passed through the photographing lens and acquire image data corresponding to a received light quantity, a storage configured to store image data obtained by the first image sensing element, a half-mirror interposed between the photographing lens and the first image sensing element and configured to split light having passed through the photographing lens, and a second image sensing element inserted in a light splitting path of the half-mirror.

According to another aspect of the present invention, an image sensing apparatus comprises a photographing lens, a first image sensing element configured to receive light having passed through the photographing lens and acquire image data corresponding to a received light quantity, a storage configured to store image data obtained by the first image sensing element, a movable half-mirror interposed between the photographing lens and the first image sensing element and configured to split light having passed through the photographing lens, a second image sensing element which is movably inserted in a light splitting path of the half-mirror, a first focus controller configured to, in photographing of a still image, retract the half-mirror from an optical axis of the photographing lens, move the photographing lens within a predetermined range, and adjust a focus, and a second focus controller configured to, in photographing of a motion image, position the half-mirror on the optical axis of the photographing lens, search for an in-focus position by moving the second image sensing element within a predetermined range, and adjust the focus by directly moving the photographing lens to the in-focus position on the basis of relative positions of the second image sensing element and the photographing lens after search.

According to still another aspect of the present invention, a focus control method in an image sensing apparatus having a photographing lens and an image sensing element comprises receiving light having passed through the photographing lens to acquire image data corresponding to a received light quantity by the image sensing element, splitting light having passed through the photographing lens by a half-mirror inserted in an optical path, searching for an in-focus position by moving within a predetermined range a second image sensing element movably inserted in a light splitting path of the half-mirror, and adjusting a focus by directly moving the photographing lens to the in-focus position on the basis of relative positions of the second image sensing element and the photographing lens after search.

According to still another aspect of the present invention, a program executed by a computer which controls an image sensing apparatus having a photographing lens and an image sensing element controls the image sensing apparatus to perform steps of receiving light having passed through the photographing lens to acquire image data corresponding to a received light quantity by the image sensing element, splitting light having passed through the photographing lens by a half-mirror inserted in an optical path, searching for an in-focus position by moving within a predetermined range a second image sensing element movably inserted in a light splitting path of the half-mirror, and adjusting a focus by directly moving the photographing lens to the in-focus position on the basis of relative positions of the second image sensing element and the photographing lens after search.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 1A and 1B are perspective views showing the outer appearance of a digital camera having a contrast AF function that is exemplified as an image sensing apparatus according to the first embodiment of the present invention;

DETAILED DESCRIPTION OF THE INVENTION

Figure 2:
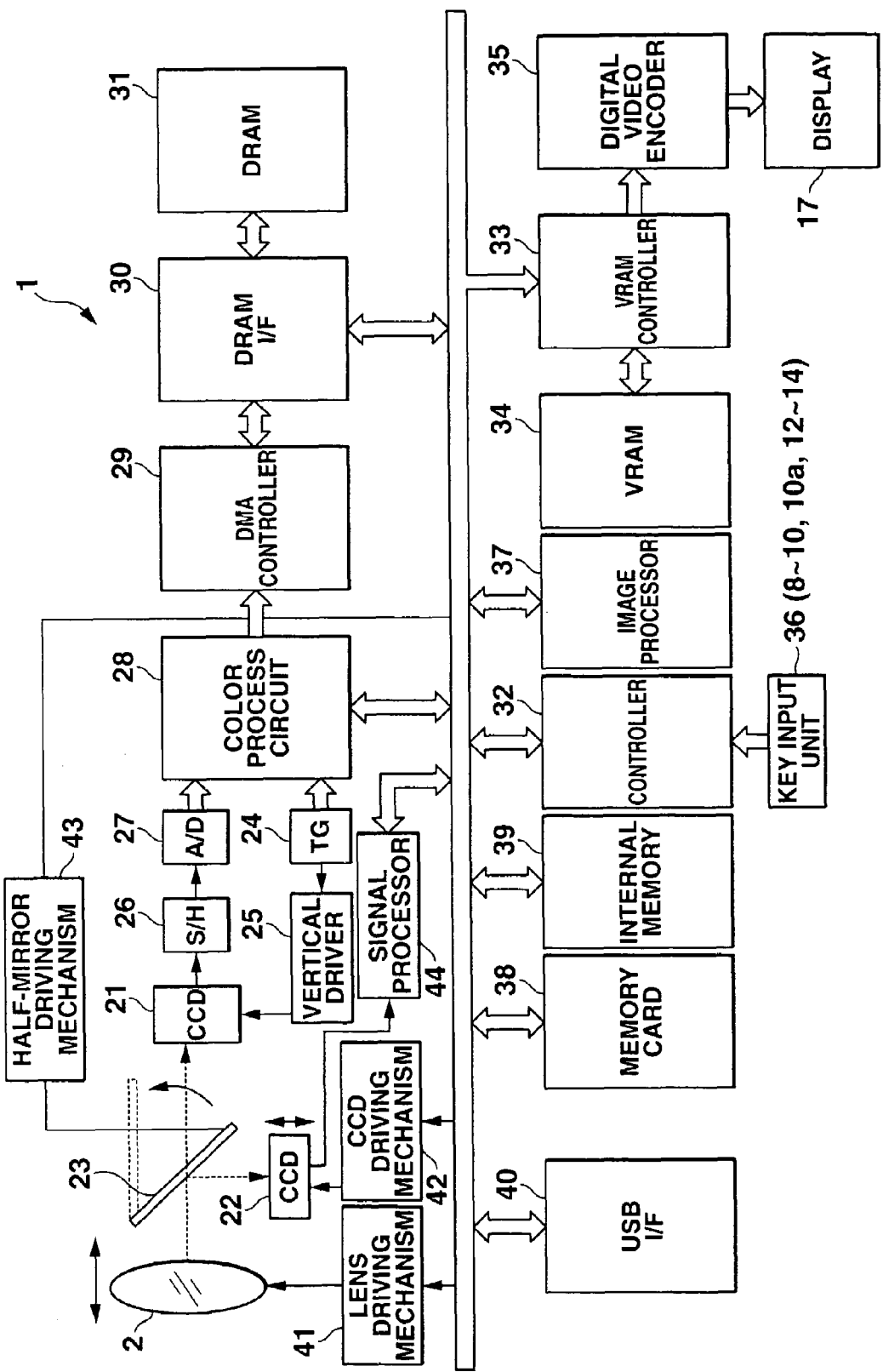
FIG. 2 is a block diagram showing the electronic circuit configuration of the digital camera.

Preferred embodiments of the present invention will be described below with reference to the several views of the accompanying drawing.

FIRST EMBODIMENT

FIGS. 1A and 1B show the outer appearance of a digital camera having a contrast AF function that is exemplified as an image sensing apparatus according to the first embodiment of the present invention. FIG. 1A is a perspective view mainly showing the arrangement of the front surface, and FIG. 1B is a perspective view mainly showing that of the rear surface.

A digital camera 1 comprises, on the front surface of an almost rectangular thin-plate like body, a photographing lens 2, self-timer lamp 3, optical viewfinder window 4, microphone 5, flash emission unit 6, and rubber grip 7. A power key 8 and shutter key 9 are arranged on the right end (viewed from the user) of the top surface.

The rubber grip 7 is a band-like rubber projection arranged so that the user can reliably grip the housing with the middle, third, and little fingers of his right hand when he grips the digital camera 1 with his right hand from the right side surface of the housing in photographing. The power key 8 is a key operated to turn on/off the power supply. The shutter key 9 designates the photographing timing in the photographing mode.

The rear surface of the digital camera 1 is equipped with a mode switch (SW) 10, motion image photographing key 10a, speaker 11, menu key 12, cross key 13, set key 14, optical viewfinder 15, flash charge lamp 16, and display 17.

The mode switch 10 is formed from, e.g., a slide key switch, and switches between a recording mode "R" and playback mode "P" serving as basic modes. The motion image photographing key 10a designates the start and end of motion image photographing while the recording mode "R" is set. That is, when the mode switch 10 is switched to the recording mode "R", the camera changes to a mode in which an image is taken (recorded). In this state, the motion image photographing key 10a is pressed to start photographing (recording) of a motion image. The motion image photographing key 10a is further pressed to end photographing of a motion image.

The menu key 12 is operated to select various menu items and the like. The cross key 13 is an integrated key of keys for moving the cursor up, down, right, and left. The cross key 13 is operated to move a displayed menu item or the like. The set key 14 is arranged at the center of the cross key 13, and operated to set the content of a currently selected menu item or the like.

The flash charge lamp 16 is formed from an LED lamp arranged close to the optical viewfinder 15. The flash charge lamp 16 allows the user to recognize the flash charge state regardless whether the user of the digital camera 1 checks an object through the optical viewfinder 15 or sees the display 17.

The display 17 is formed from a color liquid crystal panel with a backlight. The display 17 provides the monitor display of a through image as an electronic viewfinder in photographing (recording a still image or motion image), and plays back and displays a selected image or the like in playback.

Although not shown, the bottom surface of the digital camera 1 is equipped with a memory card slot for allowing the operator to insert/remove a memory card used as a recording medium, and a USB (Universal Serial Bus) connector as a serial interface connector for connecting an external personal computer or the like.

FIG. 2 is a block diagram showing the electronic circuit configuration of the digital camera 1.

In the digital camera 1, the photographing lens 2 which forms a lens optical system is movably arranged within a predetermined range along the optical axis. A CCD 21 serving as an image sensing element is arranged on the back side of the optical axis. The CCD 21 is used for photographing, and receives light having passed through the photographing lens 2 to acquire image data corresponding to the received light quantity.

In the first embodiment, a CCD 22 used for focusing in motion image photographing is movably arranged within a predetermined range in a direction perpendicular to the optical axis of the photographing lens 2 separately from the photographing CCD 21. The movable amount of the CCD 22 is about twice that of the photographing lens 2. As will be described later, the predetermined range within which the CCD 22 moves is designed so that the length of an optical path between the photographing lens 2 and the CCD 22 falls within a predetermined range in accordance with the position of the photographing lens 2. A half-mirror 23 for splitting light having passed through the photographing lens 2 into two paths for the photographing CCD 21 and focusing CCD 22 is interposed between the photographing lens 2 and the photographing CCD 21. The half-mirror 23 is attached pivotally between two positions: a position (position represented by the solid line in FIG. 2) on the optical axis of the photographing lens 2 and a position (position represented by the broken line in FIG. 2) at which the half-mirror 23 is retracted from the optical axis. When a through image (image which is obtained by the photographing lens 2 and directly displayed on the display 17) is displayed on the electronic viewfinder (display 17), the half-mirror 23 is set to the position at which the half-mirror 23 is retracted from the optical axis of the photographing lens 2.

The digital camera 1 comprises a lens driving mechanism 41 for moving the photographing lens 2, a CCD driving mechanism 42 for moving the focusing CCD 22, and a half-mirror driving mechanism 43 for pivoting the half-mirror 23. Driving operation of these mechanisms is controlled by a controller 32 serving as a microcomputer.

Image data obtained via the focusing CCD 22 is subjected to a signal process by a signal processor 44, and supplied to the controller 32. The signal processor 44 includes circuit elements such as a high-pass filter and A/D converter which extract a high-frequency component from the luminance signal of image data. The controller 32 has a function of searching for an in-focus position on the basis of the high-frequency component of the luminance signal obtained from the signal processor 44. The in-focus position is searched for by, e.g., a contrast AF method, but may be done by another method.

In FIG. 2, in the recording mode serving as a basic mode, the photographing CCD 21 on the back side of the optical axis of the photographing lens 2 is scanned and driven by a timing generator (TG) 24 and vertical driver 25. The photographing CCD 21 outputs a photoelectrically converted output of one frame that corresponds to an optical image formed every predetermined cycle.

The photoelectrically converted output properly undergoes gain adjustment for each of primary color components R, G, and B in the state of a signal of an analog value. The resultant signal is sampled and held by a sample-and-hold circuit 26, and converted into digital data by an A/D converter 27. The digital data undergoes a color process including a pixel interpolation process and γ correction process by a color process circuit 28 to generate a luminance signal Y and color difference signals Cb and Cr of digital values. These signals are output to a DMA (Direct Memory Access) controller 29.

The DMA controller 29 temporarily writes the luminance signal Y and color difference signals Cb and Cr output from the color process circuit 28 in the internal buffer of the DMA controller 29 by using composite sync signals, memory write enable signal, and clock signal from the color process circuit 28. The DMA controller 29 then DMA-transfers the luminance signal Y and color difference signals Cb and Cr to a DRAM 31 used as a buffer memory via a DRAM interface (I/F) 30.

The controller 32 is formed from a microcomputer including a CPU, a ROM which stores an operating program to be executed by the CPU, and a RAM used as a work memory. The controller 32 controls whole control operation of the digital camera 1. At the end of DMA transfer of the luminance and color difference signals to the DRAM 31, the controller 32 reads out the luminance and color difference signals from the DRAM 31 via the DRAM interface 30, and writes these signals in a VRAM 34 via a VRAM controller 33.

A digital video encoder 35 periodically reads out the luminance and color difference signals from the VRAM 34 via the VRAM controller 33, generates a video signal on the basis of these data, and outputs the video signal to the display 17.

The display 17 functions as a monitor display (electronic viewfinder) in photographing, as described above. The display 17 performs display based on the video signal from the digital video encoder 35, and displays in real time an image based on image information received from the VRAM controller 33 at this time.

While the display 17 displays the current image as a monitor image in real time, the shutter key 9 which forms a key input unit 36 is operated at a timing when a still image is to be taken, and then a trigger signal is generated.

The controller 32 stops DMA transfer of the luminance and color difference signals of one frame from the photographing CCD 21 to the DRAM 31 in response to the trigger signal. The controller 32 disconnects the route extending from the photographing CCD 21 to the DRAM 31, and transits to a recording/save state.

In the recording/save state, the controller 32 reads out the luminance and color difference signals of one frame written in the DRAM 31 via the DRAM interface 30 for a unit called a basic block of vertical 8 pixels×horizontal 8 pixels for each of the Y, Cb, and Cr components. The controller 32 writes the signals in a JPEG (Joint Photograph coding Experts Group) processing block within an image processor 37. The image processor 37 compresses data by processes such as ADCT (Adaptive Discrete Cosine Transform) or entropy coding (e.g., Huffman coding).

The controller 32 reads outs the encoded data as a data file of one image from the image processor 37, and writes the data file in a memory card 38 which is detachably mounted as a recording medium of the digital camera or an internal memory 39 which is permanently incorporated in the digital camera 1.

The controller 32 connects the route extending from the photographing CCD 21 to the DRAM 31 again upon the end of the compression process for luminance and color difference signals of one frame and write of all compressed data in the memory card 38 or internal memory 39.

The controller 32 is further connected to a USB interface (I/F) 40. The USB interface 40 performs communication control when image data and the like are exchanged with another information terminal apparatus such as a personal computer connected by a cable via a USB connector.

The key input unit 36 is made up of the shutter key 9, power key 8, mode switch 10, motion image photographing key 10a, menu key 12, cross key 13, set key 14, and the like. Signals accompanying these key operations are directly sent to the controller 32.

When the motion image photographing key 10a of the key input unit 36 is manipulated in taking not a still image but a motion image, obtained motion image data is compressed by MPEG (Moving Picture Expert Group) or motion-JPEG in a motion image processing block within the image processor 37. The motion image data is recorded on the memory card 38 or internal memory 39. When the motion image photographing key 10a is manipulated again, recording of motion image data ends.

In the playback mode as a basic mode, the controller 32 selectively reads out image data recorded on the memory card 38 or internal memory 39. The image processor 37 decompresses the compressed image data in procedures opposite to data compression procedures in the recording mode. The decompressed image data are held in the DRAM 31 via the DRAM interface 30, and the contents held by the DRAM 31 are stored in the VRAM 34 via the VRAM controller 33. The image data are periodically read out from the VRAM 34 to generate video signals, and the video signals are played back on the display 17.

When selected image data represent not still images but motion images, MPEG motion image data which form the selected motion image file are played back. At the end of playing back all the motion image data, still image data at the start is displayed until the next playback instruction is issued.

The digital camera 1 having the above arrangement according to the present invention searches for an in-focus position by moving the focusing CCD 22 in photographing. After the in-focus position is determined, the photographing lens 2 is moved to a position corresponding to that of the focusing CCD 22, and focused. In this case, the distance by which the photographing lens 2 is moved is determined in accordance with the relative positions of the photographing lens 2 and focusing CCD 22.

The positional relationship between the photographing lens 2, the photographing CCD 21, and the focusing CCD 22 in the digital camera 1 will be explained with reference to FIGS. 3A through 7.

Figure 3A:
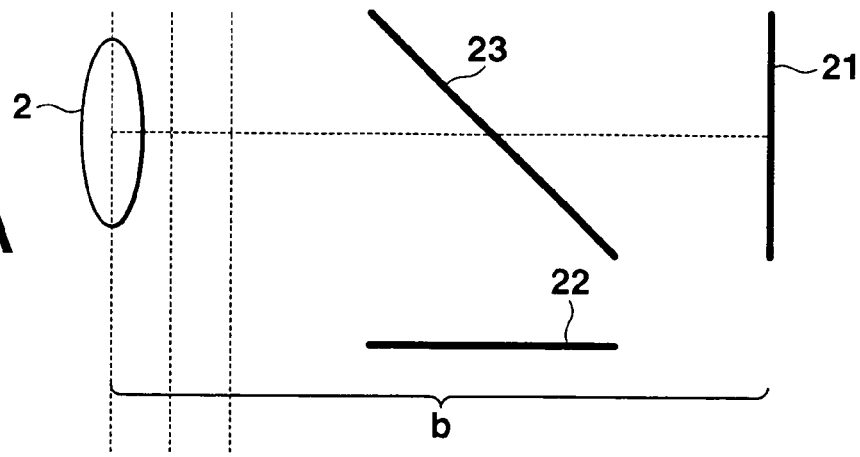
FIGS. 3A through 3C are views showing the positional relationship between the photographing lens and photographing CCD of the digital camera.
Figure 3B:
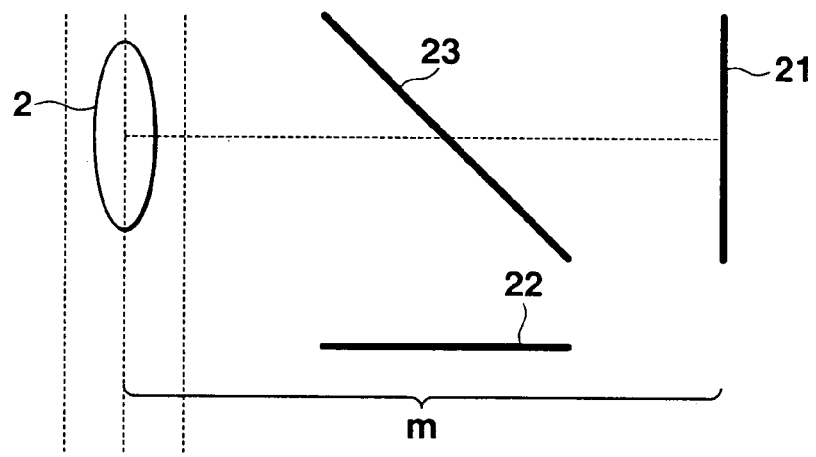
Figure 3C:
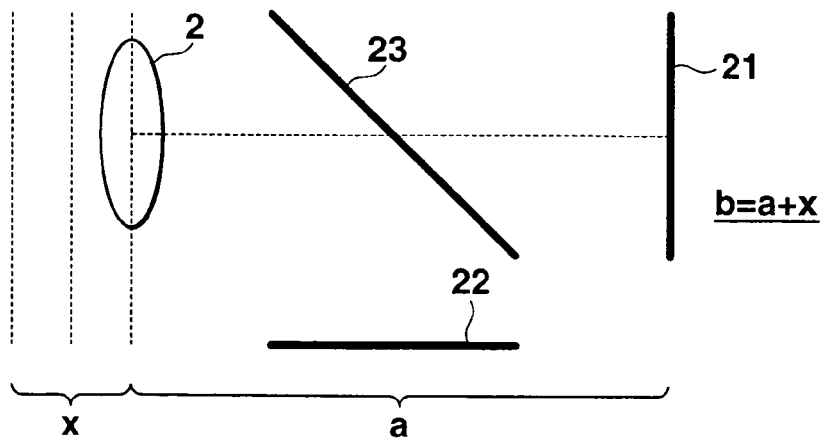

FIGS. 3A through 3C are views showing the positional relationship between the photographing lens 2 and the photographing CCD 21. FIG. 3A illustrates a case in which the photographing lens 2 is set at a position (maximum telephoto position) farthest from the photographing CCD 21. FIG. 3B illustrates a case in which the photographing lens 2 is set at an intermediate position. FIG. 3C illustrates a case in which the photographing lens 2 is set at a position (maximum wide-angle position) closest to the photographing CCD 21.

Assume that the photographing lens 2 is movably installed within a range $x$. The range $x$ corresponds to the in-focus position search range. Let $b$ be the distance between the photographing lens 2 and the photographing CCD 21 when the photographing lens 2 is set at the position (maximum telephoto position) farthest from the photographing CCD 21, as shown in FIG. 3A, and $a$ be the distance between the photographing lens 2 and the photographing CCD 21 when the photographing lens 2 is set at the position (maximum wide-angle position) closest to the photographing CCD 21, as shown in FIG. 3C. In this case, b=a+x. The intermediate position between the maximum telephoto position and the maximum wide-angle position is set as an initial position, as shown in FIG. 3B. Let $m$ be the distance between the photographing lens 2 and the photographing CCD 21 when the photographing lens 2 is set at the initial position.

Figure 4A:
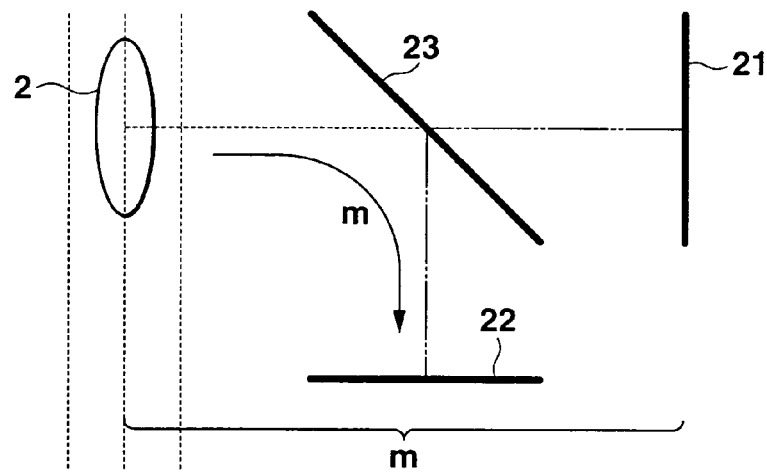
FIGS. 4A through 4C are views showing the positional relationship between the photographing lens and a focusing CCD 22 in a state in which both the photographing lens and focusing CCD of the digital camera are set at initial positions and a state in which the photographing lens is set at the maximum telephoto position.
Figure 4B:
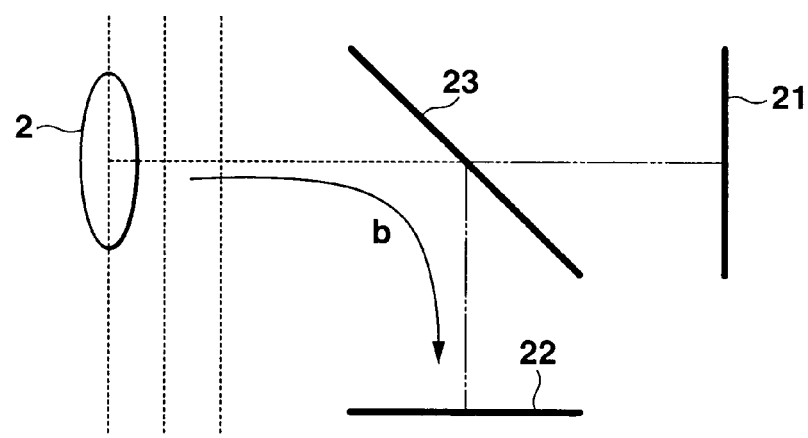
Figure 4C:
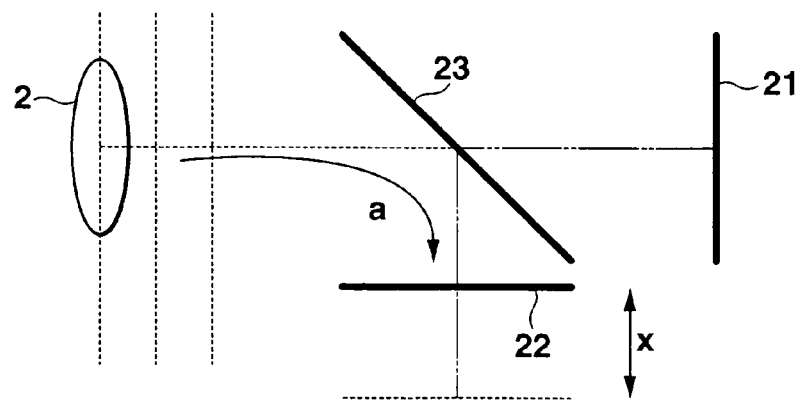

FIGS. 4A through 4C are views showing the positional relationship between the photographing lens 2 and the focusing CCD 22 in a state in which both the photographing lens 2 and focusing CCD 22 are set at the initial positions and a state in which the photographing lens 2 is set at the maximum telephoto position. FIG. 4A illustrates a case in which the photographing lens 2 is set at the initial position. FIG. 4B illustrates a case in which the photographing lens 2 moves to the maximum telephoto position. FIG. 4C illustrates a case in which the focusing CCD moves to a position corresponding to the distance $a$.

Figure 5A:
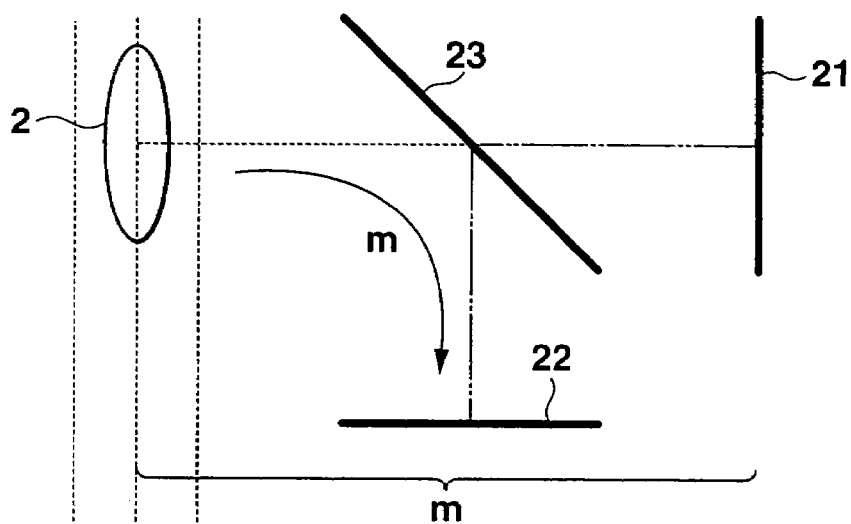
FIGS. 5A through 5C are views showing the positional relationship between the photographing lens and the focusing CCD in a state in which both the photographing lens and focusing CCD of the digital camera are set at the initial positions and a state in which a photographing lens 2 is set at the maximum wide-angle position.
Figure 5B:
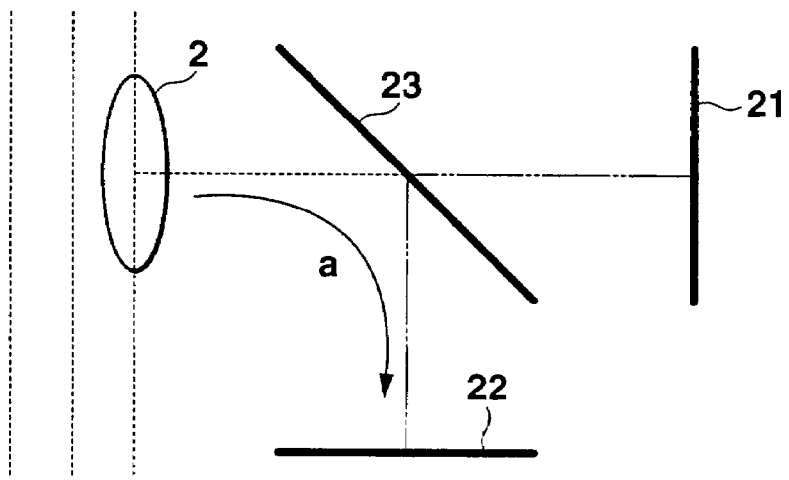
Figure 5C:
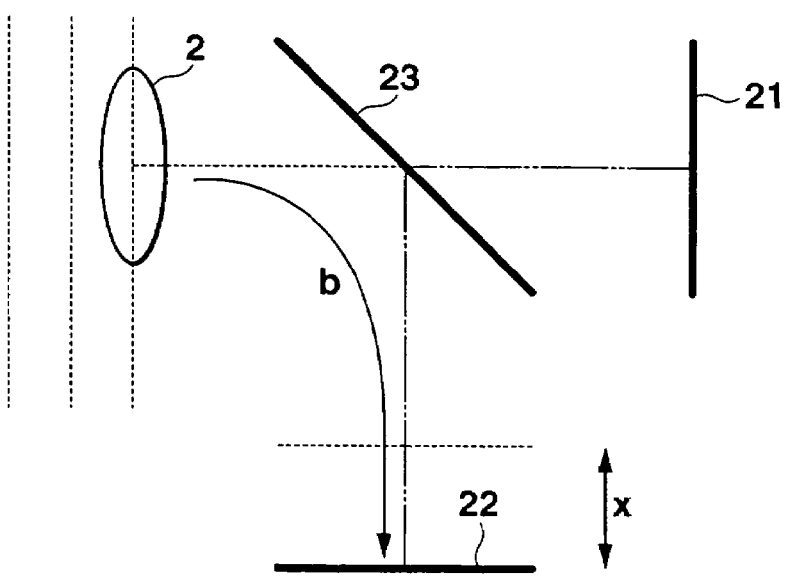

FIGS. 5A through 5C are views showing the positional relationship between the photographing lens 2 and the focusing CCD 22 in a state in which both the photographing lens 2 and focusing CCD 22 are set at the initial positions and a state in which the photographing lens 2 is set at the maximum wide-angle position. FIG. 5A illustrates a case in which the photographing lens 2 is set at the initial position. FIG. 5B illustrates a case in which the photographing lens 2 moves to the maximum wide-angle position. FIG. 5C illustrates a case in which the focusing CCD moves to a position corresponding to the distance $b$.

FIGS. 4B and 4C show positional relationships between the photographing lens 2 and the focusing CCD 22 when the photographing lens 2 moves to the maximum telephoto position (distance $b$) from the state in which both the photographing lens 2 and focusing CCD 22 are set at the initial positions (distance $m$), as shown in FIG. 4A. In this case, if only the photographing lens 2 moves to the maximum telephoto position, as shown in FIG. 4B, the distance between the photographing lens 2 and the focusing CCD 22 changes to the distance $b$. If the focusing CCD 22 further moves from the initial position by the distance $x$ toward the half-mirror 23, as shown in FIG. 4C, the distance between the photographing lens 2 and the focusing CCD 22 changes to the distance $a$.

FIGS. 5B and 5C show positional relationships between the photographing lens 2 and the focusing CCD 22 when the photographing lens 2 moves to the maximum wide-angle position (distance $a$) from the state in which both the photographing lens 2 and focusing CCD 22 are set at the initial positions (distance $m$), as shown in FIG. 5A. In this case, if only the photographing lens 2 moves to the maximum wide-angle position, as shown in FIG. 5B, the distance between the photographing lens 2 and the focusing CCD 22 changes to the Distance $a$. If the focusing CCD 22 further moves from the initial position by the distance $x$ in a direction opposite to the half-mirror 23, the distance between the photographing lens 2 and the focusing CCD 22 changes to the distance $b$.

Figure 6A:
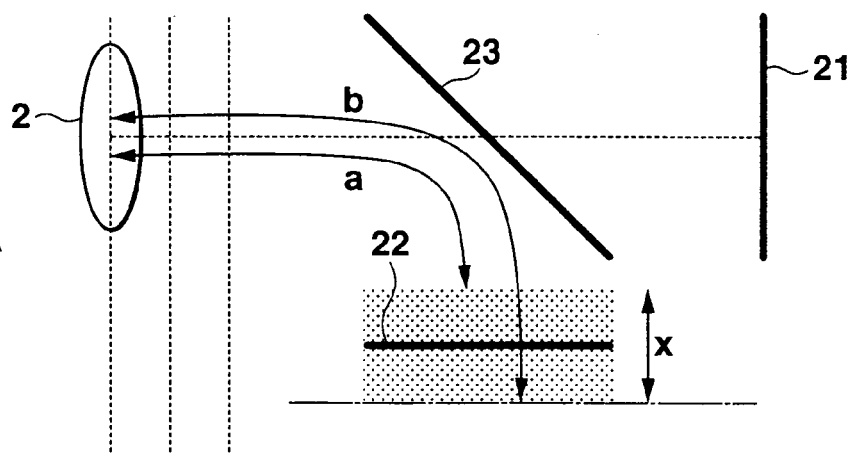
FIGS. 6A through 6C are views showing ranges within which the focusing CCD moves in correspondence with respective positions of the photographing lens of the digital camera.
Figure 6B:
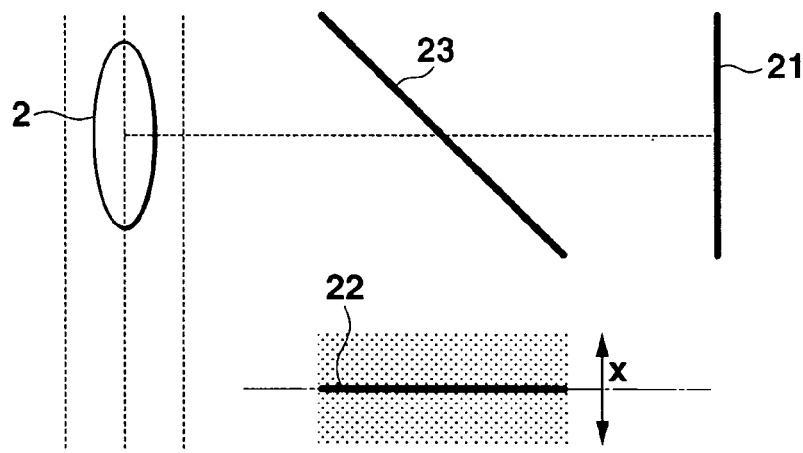
Figure 6C:
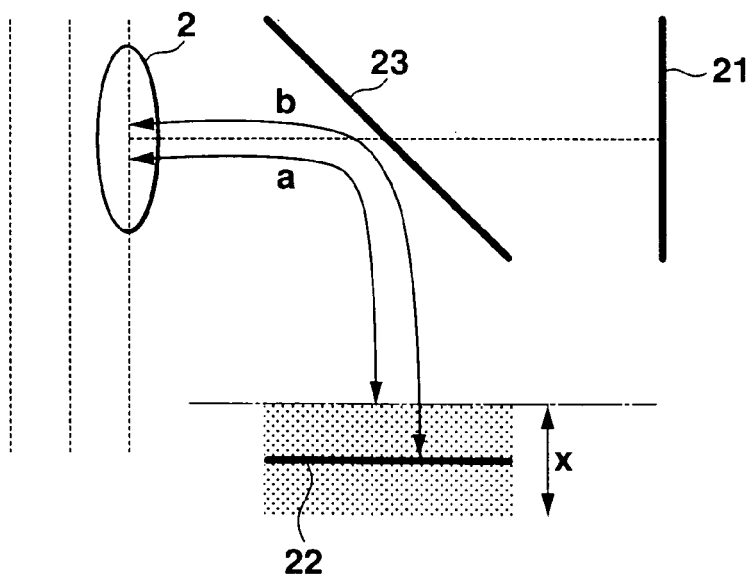

From this, ranges within which the focusing CCD 22 moves in correspondence with respective positions of the photographing lens 2 are those shown in FIGS. 6A through 6C. FIG. 6A shows the moving range of the focusing CCD 22 when the photographing lens 2 is set at the maximum telephoto position. FIG. 6B shows the moving range of the focusing CCD 22 when the photographing lens 2 is set at the intermediate position. FIG. 6C shows the moving range of the focusing CCD 22 when the photographing lens 2 is set at the maximum wide-angle position.

Figure 7:
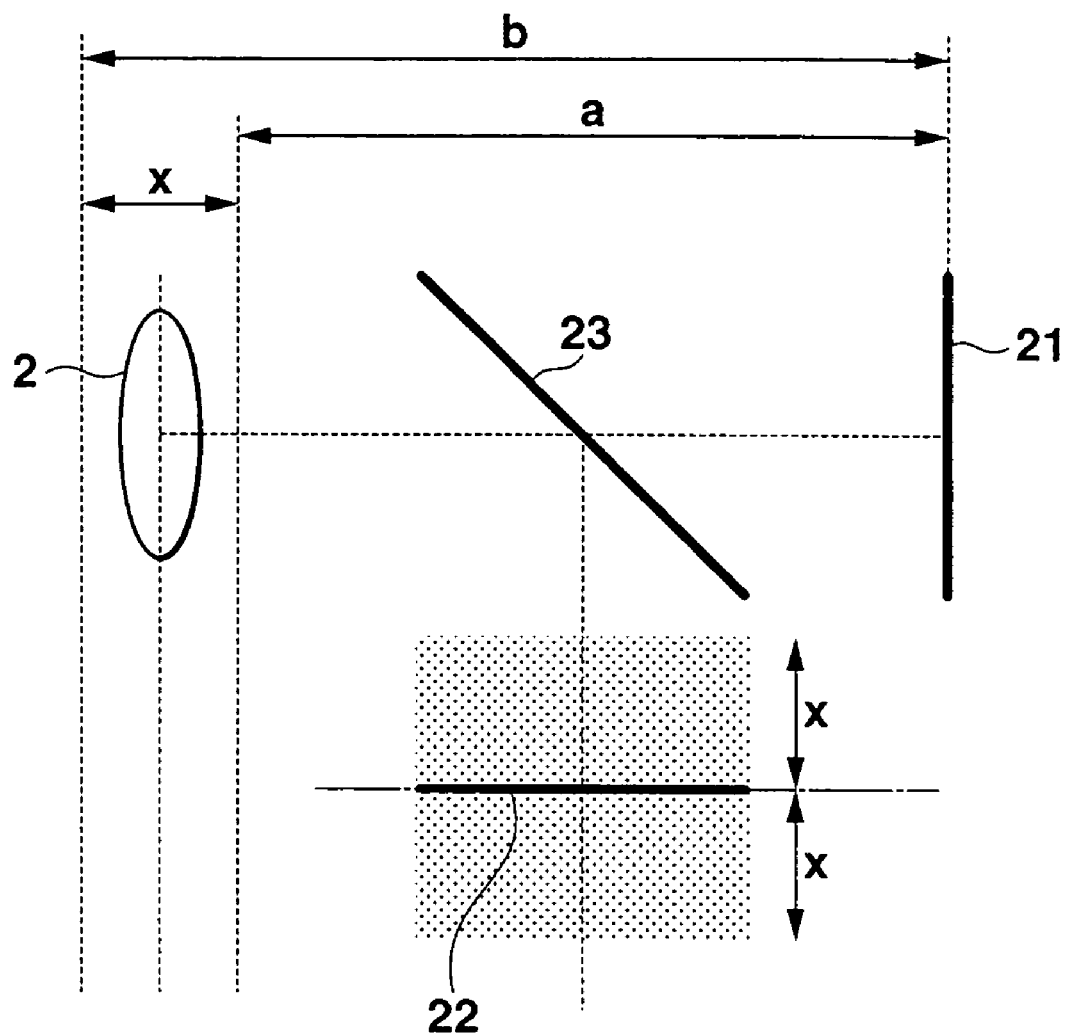
FIG. 7 is a view showing the range of the photographing lens of the digital camera and the corresponding moving range of the focusing CCD.

These ranges can be summarized into a range shown in FIG. 7. More specifically, when the photographing lens 2 is movable within the range $x$, the corresponding moving range of the focusing CCD 22 changes by $x$ up and down with respect to the initial position serving as a reference, as shown in FIG. 7.

Processing operation of the digital camera 1 in photographing according to the first embodiment will be explained in consideration of this. The process represented by the following flowchart is executed when the controller 32 as a microcomputer loads a program stored in the internal memory 39 or the like.

Figure 8:
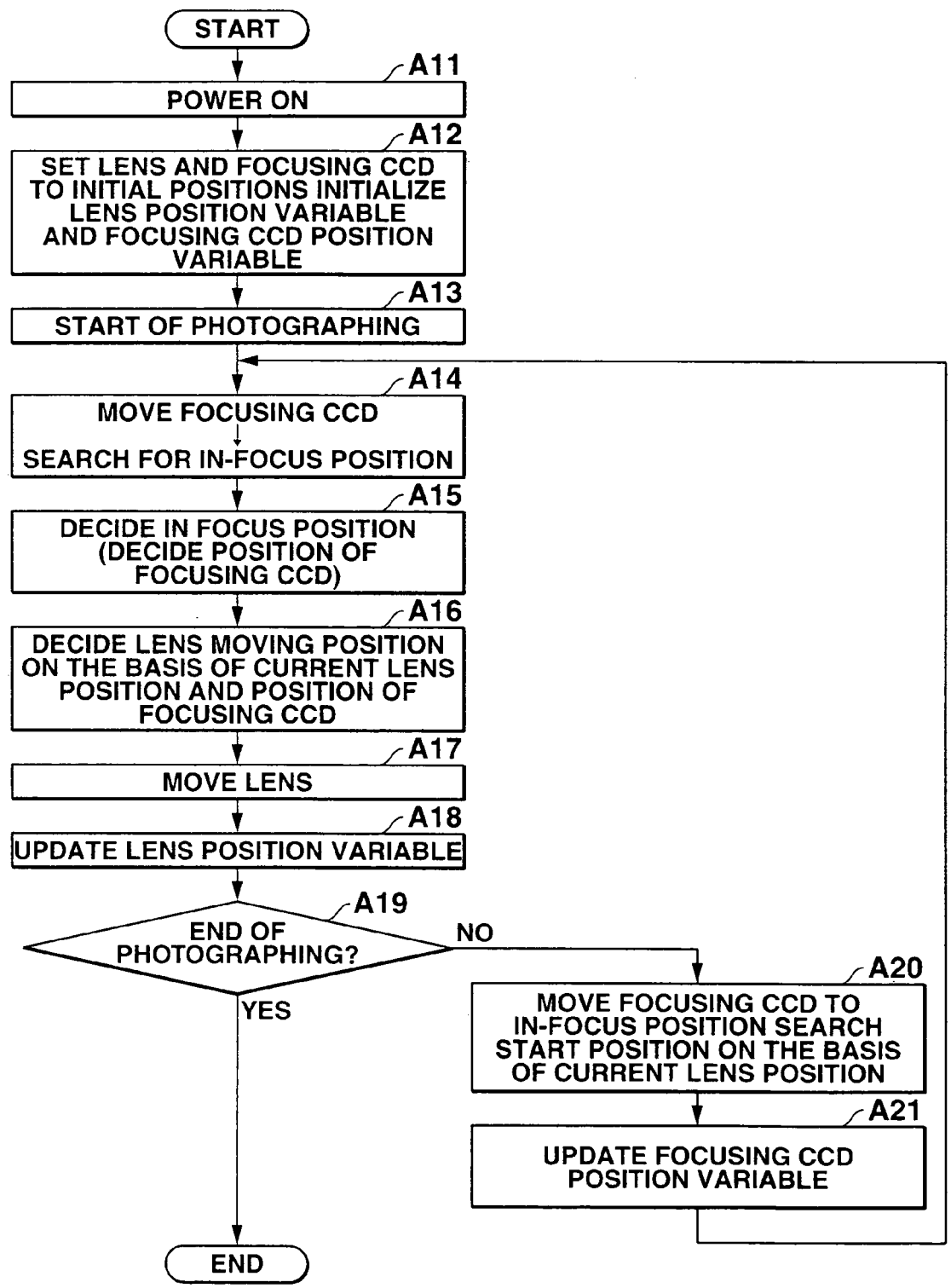
FIG. 8 is a flowchart showing processing operation of the digital camera in photographing according to the first embodiment.

FIG. 8 is a flowchart showing processing operation of the digital camera 1 in photographing according to the first embodiment.

When the power supply is turned on by pressing the power key 8 (step A11), the controller 32 sets, as an initial setting process, the photographing lens 2 and focusing CCD 22 to the initial positions. Along with this, the controller 32 initializes a position variable $r$ representing the current position of the photographing lens 2 and a position variable $k$ representing the current position of the focusing CCD 22 (step A12). The position variables $r$ and $k$ are held in the internal RAM (not shown) of the controller 32.

If the photographing lens 2 is oriented to an object to be photographed and photographing of a motion image starts by a manipulation to the motion image photographing key 10a (step A13), the AF function of the digital camera 1 acts. In response to this, the controller 32 executes the following autofocus process.

Note that photographing assumes photographing of a motion image, but the same autofocus process may also be performed for photographing of a still image.

At this time, the half-mirror 23 is positioned on the optical axis of the photographing lens 2, and light having passed through the photographing lens 2 is split toward the photographing CCD 21 and focusing CCD 22 via the half-mirror 23.

When photographing of a motion image starts by a manipulation to the motion image photographing key 10a, the controller 32 moves the focusing CCD 22 via the CCD driving mechanism 42 within a predetermined range forward or backward in a direction perpendicular to the optical axis of the photographing lens 2. With this operation, the controller 32 searches for an in-focus position with respect to the current object to be photographed (step A14).

Since light enters the focusing CCD 22 via the half-mirror 23, the focusing CCD 22 can be moved in the direction perpendicular to the optical axis of the photographing lens 2 by moving the focusing CCD 22 close to or distant from the half-mirror.

Light having passed through the photographing lens 2 enters both the photographing CCD 21 and focusing CCD 22 via the half-mirror 23. Image data obtained by the photographing CCD 21 is stored in a predetermined memory (memory card 38 or internal memory 39).

Image data obtained by the focusing CCD 22 is used to adjust the focus. The controller 32 decides, as an in-focus position, the position of the focusing CCD 22 at which the high-frequency component contained in the luminance signal of the image data maximizes (step A15). Even when the focusing CCD 22 is moved for searching for an in-focus position, an image which is supplied to the photographing CCD 21 and recorded is not affected.

On the basis of the position of the focusing CCD 22 and the current position of the photographing lens 2, the controller 32 decides a position to which the photographing lens 2 is to be moved so that the distance between the photographing lens 2 and the photographing CCD 21 becomes equal to that between the photographing lens 2 and the focusing CCD 22 (step A16). The lens driving mechanism 41 is driven to move the photographing lens 2 to the decided position (step A17). This movement of the photographing lens 2 and focusing CCD 22 will be described later in detail with reference to FIGS. 9A through 9H.

After the photographing lens 2 moves, the controller 32 updates the position variable r in accordance with the position of the moving destination (step A18). If photographing continues (NO in step A19), the controller 32 moves the focusing CCD 22 to an in-focus position search start position (position at which the distance between the photographing lens 2 and the focusing CCD 22 becomes the distance m) on the basis of the current position of the photographing lens 2 (step A20). The controller 32 updates the position Variable k in accordance with this position (step A21), and then repetitively executes the process from step A14.

Movement of the photographing lens 2 and focusing CCD 22 will be explained in detail with reference to an example in FIGS. 9A through 9H. FIGS. 9A through 9E show movement of the photographing lens 2 and focusing CCD 22 sequentially from the start of photographing.

Figure 9A:
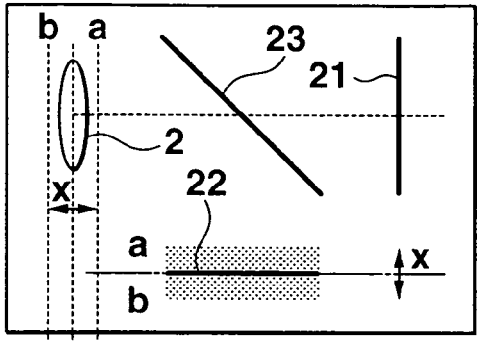
FIGS. 9A through 9H are views for explaining movement of the photographing lens and focusing CCD in photographing with the digital camera.

FIG. 9A illustrates a state before the start of photographing. The photographing lens 2 and focusing CCD 22 are set at the initial positions (step A12 of FIG. 8). When photographing starts in this state, the focusing CCD 22 moves within the range x up or down in a direction perpendicular to the optical axis of the photographing lens 2. During this operation, an in-focus position is searched for on the basis of image data obtained from the focusing CCD 22 (see step A14 of FIG. 8). At this time, the photographing CCD 21 executes photographing operation, and image data obtained from the photographing CCD 21 is stored in a predetermined memory.

Figure 9E:
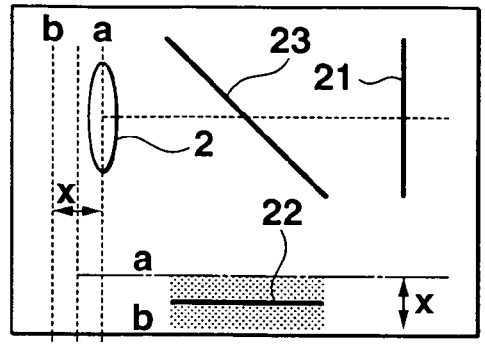
Figure 9B:
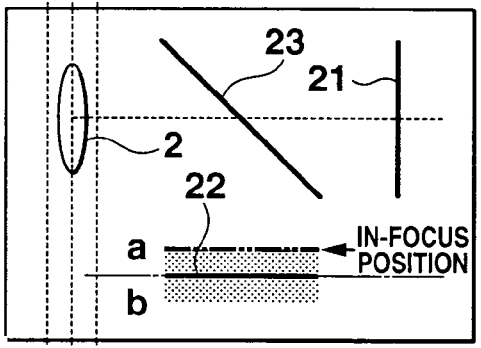
Figure 9F:
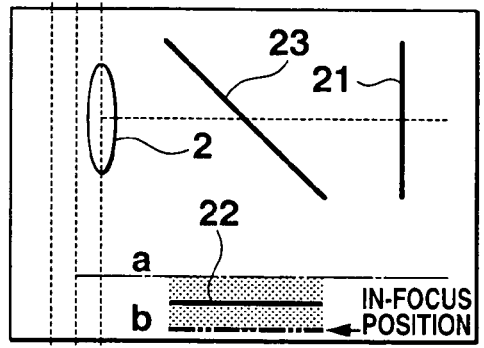
Figure 9C:
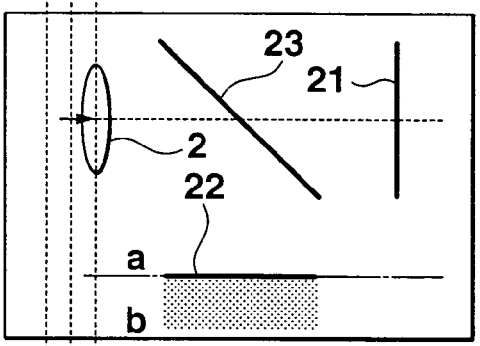

When the photographing lens 2 is focused at a position shown in FIG. 9B (the high-frequency component maximizes), this position is decided as an in-focus position (step A15 of FIG. 8). The moving position of the photographing lens 2 is decided from the positional relationship between the focusing CCD 22 and the photographing lens 2 (step A16 of FIG. 8). As shown in FIG. 9C, the photographing lens 2 moves to the maximum wide-angle position by the distance a from the photographing CCD 21 so that the distance between the photographing lens 2 and the photographing CCD 21 becomes equal to that between the photographing lens 2 and the focusing CCD 22 (step A18 of FIG. 8).

Figure 9G:
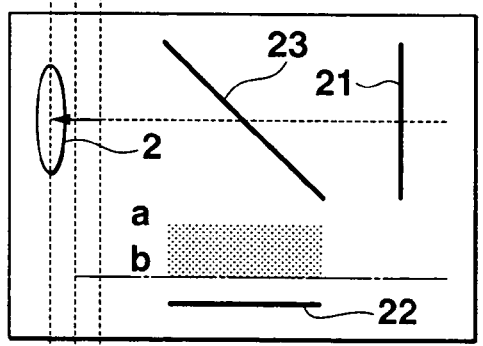
Figure 9D:
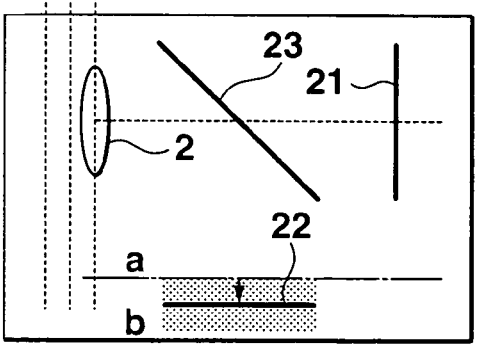

At this time, the in-focus position search start position is changed in accordance with the moved photographing lens 2. As shown in FIG. 9D, the focusing CCD 22 moves down from the initial position by x/2 so that the distance between the focusing CCD 22 and the photographing lens 2 changes to m with respect to the position of the moved photographing lens 2 (step A20 of FIG. 8).

Figure 9H:
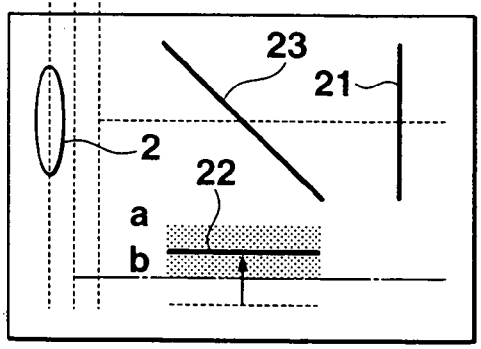

After that, the same operation is repeated. More specifically, when the photographing lens 2 is set at the maximum wide-angle position, search for an in-focus position starts by using, as a reference, a position to which the focusing CCD 22 moves down from the initial position by x/2, as shown in FIG. 9E. When the position shown in FIG. 9F is detected as an in-focus position, the photographing lens 2 moves to the maximum telephoto position by the distance b from the photographing CCD 21, as shown in FIG. 9G. At this time, the focusing CCD 22 moves as shown in FIG. 9H so as to prepare for the next search operation.

SECOND EMBODIMENT

In the first embodiment, photographing is always done via the half-mirror 23 regardless of photographing of a still image/motion image.

In the second embodiment, a half-mirror 23 is used only when a motion image is taken, and is not used when a still image is taken. In this case, a general autofocus process is applied to photographing of a still image. As shown in FIG. 2, the half-mirror 23 can be pivoted by driving of a half-mirror driving mechanism 43 between a position on the optical axis of a photographing lens 2 and a position retracted from the optical axis.

Figure 10:
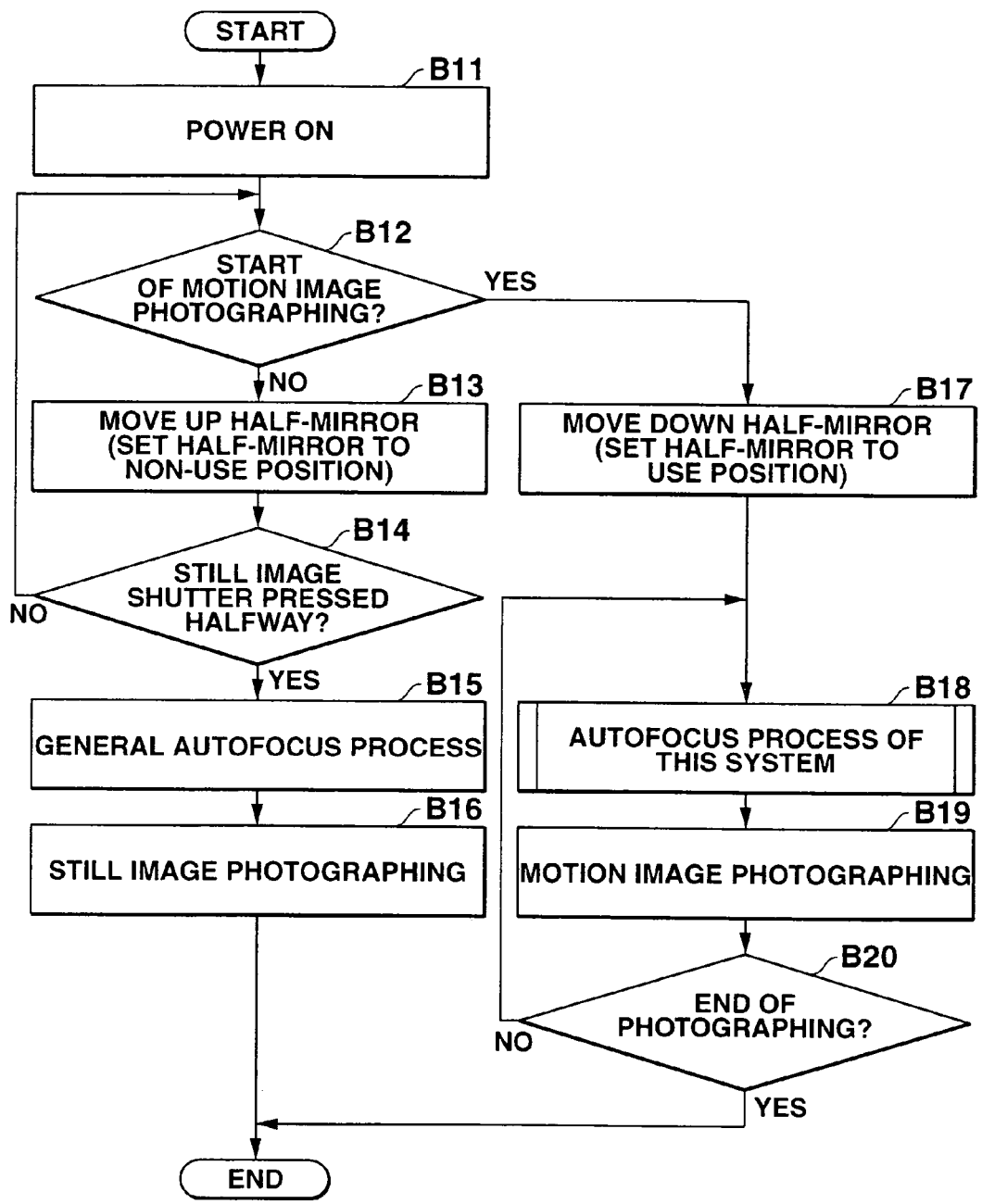
FIG. 10 is a flowchart showing processing operation of the digital camera in photographing according to the second embodiment.

FIG. 10 is a flowchart showing processing operation of a digital camera 1 in photographing according to the second embodiment.

When the power supply is turned on by pressing a power key 8 (step B11), a controller 32 determines whether the start of motion image photographing is designated (step B12). Photographing of a motion image starts by pressing a motion image photographing key 10a while a mode switch 10 shown in FIG. 1B is switched to the recording mode "R". In an initial state such as power-on, the half-mirror 23 is set at a use position represented by the solid line in FIG. 2 on the optical axis of the photographing lens 2.

If the start of motion image photographing is not designated (NO in step B12), the controller 32 drives the half-mirror driving mechanism 43 to move up the half-mirror 23 to a position represented by the broken line in FIG. 2 and retract it from the optical axis of the photographing lens 2 (step B13). At the timing when a shutter key 9 is pressed halfway (YES in step B14), the controller 32 executes a general autofocus process (step B15).

The general autofocus process is to move the photographing lens 2 forward and backward along the optical axis by driving of the lens driving mechanism 41, search for an in-focus position on the basis of the luminance signal of image data obtained from a photographing CCD 21 during movement of the photographing lens 2, and position the photographing lens 2 to the in-focus position. After the focus is adjusted by the autofocus process, image data obtained from the photographing CCD 21 at this position is stored in a predetermined memory (memory card 38 or internal memory 39) (step B16).

If the start of motion image photographing is designated (YES in step B12) and the half-mirror 23 is up, the controller 32 drives the half-mirror driving mechanism 43 to move down the half-mirror 23 to the position represented by the solid line in FIG. 2 and set the half-mirror 23 on the optical axis of the photographing lens 2 (step B17). Thereafter, the controller 32 executes the autofocus process of this system (step B18).

The autofocus process of this system is to search for an in-focus position by using a focusing CCD 22 and directly move the photographing lens 2 to the position, as described in the first embodiment. This processing operation is the same as that of the flowchart in FIG. 8, and a description thereof will be omitted.

Upon power-on, the half-mirror 23 is set at the use position in advance. Immediately when the start of motion image photographing is designated, photographing can be executed without moving the half-mirror 23.

The controller 32 successively stores image data obtained from the photographing CCD 21 during autofocus operation in a predetermined memory (memory card 38 or internal memory 39) (steps B19 and B20). In this case, the autofocus process of this system can provide high-quality in-focus image data even during autofocus operation, as described above.

In the second embodiment, the initial position of the half-mirror 23 is set on the optical axis of the photographing lens 2, and in photographing of a still image, the half-mirror 23 is moved up and retracted from the optical axis of the photographing lens 2. However, these positions may be reversed.

That is, the initial position of the half-mirror 23 is set to a position (non-use position) retracted from the optical axis of the photographing lens 2. Only in photographing of a motion image, the half-mirror 23 may be moved down and positioned on the optical axis of the photographing lens 2.

The driving mechanism of the half-mirror 23 is not particularly limited. The half-mirror 23 may be pivoted up and down by using one end of the half-mirror 23 as a fulcrum, as shown in FIG. 2. In addition, a slidable half-mirror may be used and slid on the optical axis in photographing of a motion image.

The above embodiments have exemplified a digital camera. However, the present invention can be applied to any electronic device having a camera function such as a camera-equipped cell phone.

The present invention is not limited to the above embodiments, and can be variously modified without departing from the spirit and scope of the invention is on the practical stage. The embodiments include inventions on various stages, and various inventions can be extracted by an appropriate combination of building components disclosed.

The method described in the above embodiments can be written as a program executable by a computer in a recording medium such as a magnetic disk (e.g., flexible disk or hard disk) or an optical disk (e.g., CD-ROM or DVD), and applied to various apparatuses. The program itself may be transmitted by a transmission medium such as a network, and applied to various apparatuses. The computer which implements the apparatus loads the program recorded on the recording medium or the program provided via the transmission medium, and executes the above-described process by controlling the operation in accordance with the program.

The present invention can be practiced by using various large-capacity recording media which will be developed in the future, such as a next-generation optical disk using a blue laser (e.g., Blue-ray Disc® or AOD (Advanced Optical Disc)), an HD-DVD 9 using a red laser, and a blue laser DVD using a blue-violet laser in addition to the above-mentioned recording media such as a CD-ROM and DVD-ROM.

Various illustrative logical blocks, modules, and circuits described in association with the above embodiments may be implemented by a general-purpose processor, a digital signal processor (DSP), an application specific IC (ASIC), a field programmable gate array (FPGA), another programmable logic device, a discrete gate or transistor logic element, a discrete hardware element, or an arbitrary combination designed to execute the above-described functions.

The controller 32 may be implemented by a processor, controller, or microcontroller. The processor may be, e.g., a combination of a DSP and microprocessor, a plurality of microprocessors, one or a plurality of microprocessors interlocked with a DDSP core, or a combination of computers having such configuration.

The operation program may be resident in a RAM memory, a flash memory, a ROM memory, an EPROM memory, an EEPROM memory, a register, a hard disk, a removable disk, a CD-ROM, or a storage medium of an arbitrary technically known form.

The storage medium which stores the operation program may be coupled to a processor so as to be able to read information from the processor and write information in the storage medium. The processor and storage medium may be resident in the ASIC. Alternatively, the processor and storage medium may be resident as different building components in the image sensing apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image sensing apparatus comprising:
   a photographing lens;
   a first image sensing element configured to receive light having passed through the photographing lens and acquire image data corresponding to a received light quantity;
   a storage unit configured to store image data obtained by the first image sensing element;
   a half-mirror interposed between the photographing lens and the first image sensing element and configured to split light having passed through the photographing lens;
   a second image sensing element arranged movably along a light splitting path of the half-mirror; and
   a controller which controls a position of the photographing lens based on a position of the second image sensing element.

2. An apparatus according to claim 1, wherein a movable amount of the second image sensing element is substantially twice a movable amount of the photographing lens.

3. An apparatus according to claim 1, further comprising a focus controller configured to search for an in-focus position by moving the second image sensing element within a predetermined range in photographing, and adjust a focus by moving the photographing lens to the in-focus position based on relative positions of the second image sensing element and the photographing lens after searching for the in-focus position.

4. An apparatus according to claim 3, wherein the predetermined range within which the second image sensing element is movable includes a range in which a length of an optical path between the photographing lens and the second image sensing element becomes substantially equal to a length of the predetermined range in accordance with the position of the photographing lens.

5. An apparatus according to claim 1, wherein the image data stored in the storage unit includes motion image data.

6. An apparatus according to claim 3, wherein the in-focus position is searched for by a contrast AF method.

7. An image sensing apparatus comprising:
a photographing lens;
a first image sensing element configured to receive light having passed through the photographing lens and acquire image data corresponding to a received light quantity;
a storage unit configured to store image data obtained by the first image sensing element;
a movable half-mirror interposed between the photographing lens and the first image sensing element and configured to split light having passed through the photographing lens;
a second image sensing element which is movably inserted in a light splitting path of the half-mirror;
a first focus controller configured to, in photographing of a still image, retract the half-mirror from an optical axis of the photographing lens, move the photographing lens within a predetermined range, and adjust a focus; and
a second focus controller configured to, in photographing of a motion image, position the half-mirror on the optical axis of the photographing lens, search for an in-focus position by moving the second image sensing element within a predetermined range, and adjust the focus by directly moving the photographing lens to the in-focus position based on relative positions of the second image sensing element and the photographing lens after searching for the in-focus position.

8. An apparatus according to claim 7, wherein the half-mirror is positioned on the optical axis of the photographing lens in an initial state, and set to a position retracted from the optical axis of the photographing lens in photographing of a still image.

9. An apparatus according to claim 7, wherein the half-mirror is set at a position retracted from the optical axis of the photographing lens in an initial state, and set to a position on the optical axis of the photographing lens in photographing of a motion image.

10. An apparatus according to claim 7, wherein when a through image is displayed on an electronic viewfinder of the image sensing apparatus, the half-mirror is set to a position retracted from the optical axis of the photographing lens.

11. An apparatus according to claim 7, wherein the half-mirror is retracted from the optical axis by pivoting the half-mirror by using one end of the half-mirror as a fulcrum.

12. An apparatus according to claim 7, wherein the half-mirror is retracted from the optical axis by sliding the half-mirror.

13. A focus control method in an image sensing apparatus having a photographing lens and an image sensing element, comprising:
splitting light having passed through the photographing lens by a half-mirror inserted in an optical path;
searching for an in-focus position by moving within a predetermined range a second image sensing element movably inserted in a light splitting path of the half-mirror; and
adjusting a focus by directly moving the photographing lens to the in-focus position based on relative positions of the second image sensing element and the photographing lens after searching for the in-focus position.

14. A method according to claim 13, further comprising:
in photographing of a still image, retracting the half-mirror from an optical axis of the photographing lens, moving the photographing lens within a predetermined range, and adjusting the focus; and
in photographing of a motion image, positioning the half-mirror on the optical axis of the photographing lens, splitting light having passed through the photographing lens by the half-mirror inserted in the optical path, searching for the in-focus position by moving within the predetermined range the second image sensing element movably inserted in the light splitting path of the half-mirror, and adjusting the focus by directly moving the photographing lens to the in-focus position based on the relative positions of the second image sensing element and the photographing lens after searching for the in-focus position.

15. A recording medium having stored thereon a computer program which is executable by a controller of an image sensing apparatus having a photographing lens and an image sensing element, to control the image sensing apparatus to perform functions of:
receiving light having passed through the photographing lens to acquire image data corresponding to a received light quantity by the image sensing element;
splitting light having passed through the photographing lens by a half-mirror inserted in an optical path;
searching for an in-focus position by moving within a predetermined range a second image sensing element movably inserted in a light splitting path of the half-mirror; and
adjusting a focus by directly moving the photographing lens to the in-focus position based on relative positions of the second image sensing element and the photographing lens after searching for the in-focus position.

16. A recording medium according to claim 15, wherein the program further controls the image sensing apparatus to further perform functions of:
in photographing of a still image, retracting the half-mirror from an optical axis of the photographing lens, moving the photographing lens within a predetermined range, and adjusting the focus, and
in photographing of a motion image, positioning the half-mirror on the optical axis of the photographing lens, splitting light having passed through the photographing lens by the half-mirror inserted in the optical path, searching for the in-focus position by moving within the predetermined range the second image sensing element movably inserted in the light splitting path of the half-mirror, and adjusting the focus by directly moving the photographing lens to the in-focus position based on the relative positions of the second image sensing element and the photographing lens after searching for the in-focus position.

17. An image sensing apparatus according to claim 3, further comprising a search range modification controller configured to modify a search range of the in-focus position of the second image sensing element after adjusting the focus by the focus controller.

18. An image sensing apparatus according to claim 3, further comprising a movement controller to move the second image sensing element, after adjusting the focus by the focus controller, so that a distance between the photographing lens and the first image sensing element and a distance between the photographing lens and the second image sensing element become substantially equal.

19. An image sensing apparatus according to claim 17, further comprising a movement controller to move the second image sensing element, after adjusting the focus by the focus controller, so that a distance between the photographing lens and the first image sensing element and a distance between the photographing lens and the second image sensing element become substantially equal.

* * * * *